United States Patent
Moulaire et al.

(10) Patent No.: US 10,486,738 B2
(45) Date of Patent: Nov. 26, 2019

(54) METHOD OF MANAGING ASSISTED STEERING WITH INDIRECT RECONSTRUCTION OF THE STEERING WHEEL TORQUE INFORMATION

(71) Applicant: JTEKT EUROPE, Irigny (FR)

(72) Inventors: Pascal Moulaire, La Tour de Salvagny (FR); Yoann Baudin, Lyons (FR); Serge Gaudin, Saint Jean de Toulas (FR); Ofaina Taofifenua, Lyons (FR); Kazusa Yamamoto, Lyons (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 16/087,980

(22) PCT Filed: Mar. 23, 2017

(86) PCT No.: PCT/FR2017/050677
§ 371 (c)(1),
(2) Date: Sep. 24, 2018

(87) PCT Pub. No.: WO2017/162987
PCT Pub. Date: Sep. 28, 2017

(65) Prior Publication Data
US 2019/0315392 A1    Oct. 17, 2019

(30) Foreign Application Priority Data
Mar. 24, 2016    (FR) ...................... 16 52528

(51) Int. Cl.
*B62D 5/04*    (2006.01)
(52) U.S. Cl.
CPC ........... *B62D 5/0463* (2013.01); *B62D 5/049* (2013.01)
(58) Field of Classification Search
CPC .............................. B62D 5/0463; B62D 5/049
See application file for complete search history.

(56) References Cited

U.S. PATENT DOCUMENTS 6,408,235 B1 * 6/2002 Tanke, II ............. B62D 5/0469
180/443
7,155,906 B2 * 1/2007 Yokota ................... B62D 5/065
60/403

(Continued)

FOREIGN PATENT DOCUMENTS

EP    1 995 150 A2    11/2008

OTHER PUBLICATIONS

Jun. 8, 2017 International Search Report issued in International Patent Application No. PCT/FR2017/050677.

(Continued)

*Primary Examiner* — Russell Frejd
(74) *Attorney, Agent, or Firm* — Oliff PLC (57) ABSTRACT

The invention relates to a method for managing an assisted steering device (1) for a vehicle (2) comprising a steering wheel (3) on which the driver exerts a manoeuvring effort, termed the "steering wheel torque" (T3), as well as an assistance motor (12) intended to provide an assistance effort (T12), said method comprising a steering wheel torque reconstruction step (a) in the course of which the steering wheel torque (T3) is evaluated, such as is actually exerted by the driver on the steering wheel (3), without calling upon a steering wheel torque sensor (14) specifically dedicated to the measurement of said steering wheel torque, but by reconstructing an information item representative of said steering wheel torque (T3), termed the "estimated steering wheel torque" (T3_estim), on the basis of data termed "external data" (83, 812, 8'3, 8'12) that is gathered outside a specific steering wheel torque sensor (14) such as this and which include the angular position of the steering wheel (83), the angular position (812) of the shaft of the assistance motor (12), and the time derivatives (8'3, 8'12) of these angular positions.

13 Claims, 4 Drawing Sheets

(56) References Cited

U.S. PATENT DOCUMENTS

| | | | | |
|---|---|---|---|---|
| 7,213,676 | B2* | 5/2007 | Soeda | B62D 5/065 |
| | | | | 180/403 |
| 8,306,698 | B2* | 11/2012 | Suzuki | B62D 5/0457 |
| | | | | 180/402 |
| 9,950,735 | B2* | 4/2018 | Barthomeuf | B62D 5/0469 |
| 10,282,923 | B2* | 5/2019 | Tieman | G07C 5/008 |
| 2015/0367881 | A1 | 12/2015 | Tsunoda et al. | |

OTHER PUBLICATIONS

Jun. 8, 2017 Written Opinion issued in International Patent Application No. PCT/FR2017/050677.

* cited by examiner

METHOD OF MANAGING ASSISTED STEERING WITH INDIRECT RECONSTRUCTION OF THE STEERING WHEEL TORQUE INFORMATION

The present invention concerns a power steering device management method for a vehicle, in particular for a motor vehicle.

Currently, many power steering devices use an electric assist motor, which is servo-controlled according to predetermined assist laws.

Such a servo-control requires, in practice, knowing at every moment the value of the torque, called «steering wheel torque», which is exerted by the driver of the vehicle on the steering wheel, to the extent that the assist force to be delivered by the assist motor depends closely on said steering wheel torque value.

That is why the known electric power steering devices systematically include a steering wheel torque sensor which is installed on the steering column and which is specifically dedicated to measuring of said steering wheel torque.

One of the drawbacks of such a structure is that it is relatively vulnerable to a possible failure of the steering wheel torque sensor.

Indeed, it is easy to understand that if the steering wheel torque sensor returns a steering wheel torque information which is no longer representative of the actual situation, or even if said steering wheel torque sensor purely and simply stops providing any steering wheel torque information, then the application of the assist laws will be distorted, at the risk of causing an erratic, or even dangerous, behavior of the assist motor and therefore of the vehicle.

As a safety measure, the known solution consists in totally interrupting the steering assistance when a failure of the steering wheel torque sensor is detected.

In such a situation, the driver may therefore maintain the manual monitoring of the vehicle, but is deprived of steering assistance, which imposes an additional force and vigilance on him.

Moreover, like any other member of the power steering device, the steering wheel torque sensor has its own weight and bulk, which increase the weight and bulk of the steering device, and more generally of the vehicle.

The objects assigned to the invention consequently aim at overcoming the aforementioned drawbacks and at proposing a new power steering system which, while being lightweight and inexpensive to implement, remains operational even in case of failure, or absence, of a sensor specifically assigned to measuring of steering wheel torque.

The objects assigned to the invention are achieved by means of a method of managing a power steering device for a vehicle, said power steering device comprising a steering wheel which allows a driver to maneuver said power steering device by exerting a force, called «steering wheel torque», on said steering wheel, as well as an assist motor intended to provide an assist force to assist the maneuver of said power steering device, said method being characterized in that it comprises a step (a) of reconstructing a steering wheel torque during which the steering wheel torque is evaluated, as it is actually exerted by the driver on the steering wheel, by reconstructing a representative information of said steering wheel torque, called «estimated steering wheel torque», from data called «external data» which are collected within the power steering device or within the vehicle, but excluding a steering wheel torque sensor specifically dedicated to measuring of said steering wheel torque, said external data comprising a value called «steering wheel angle» representative of the angular position of the steering wheel, a value called «motor angle» representative of the angular position of the shaft of the assist motor, as well as the time derivatives of said steering wheel angle and said motor angle.

The invention is therefore intended to estimate the steering wheel torque value from the angular position of the steering wheel and from the angular position of the shaft of the assist motor, and from the time derivatives calculated from these data, which data may advantageously be acquired, and more particularly measured, by means of integrated sensors already present in a standard manner at the level of the steering wheel, on the one hand, and the assist motor, on the other hand, without the need to use a third distinct sensor, which would be exclusively dedicated to measuring of the steering wheel torque.

Advantageously, by reconstructing reliable steering wheel torque information from external data coming from members other than the steering wheel torque sensor, the invention allows eliminating the need for the steering wheel torque sensor, and ensuring the continuity of service of the steering assistance in a reliable and sustainable manner even if no exploitable signal is recoverable from the signal(s) normally emitted by said steering wheel torque sensor, for example due to a failure of said steering wheel torque sensor.

Still better, such a method even allows purely and simply abandoning the material presence of a specific steering wheel torque sensor, and replacing it with a kind of «virtual sensor» which uses external data made accessible by third-party sensors, already present for other purposes within the power steering device.

Thus, the invention somehow allows adding a function to already existing sensors, which in principle are not intended at the origin to determine the value of the steering wheel torque, and thus to use in fine said existing sensors instead of an additional steering wheel torque sensor.

By using already existing sensors in a versatile manner, for several purposes including that (non-exclusive) purpose of reconstructing a steering wheel torque information, it is therefore possible to advantageously avoid the need for a specific steering wheel torque sensor, and the structure of the power steering device may thus be simplified and lightened.

Moreover, by jointly using, on the one hand, angular position information, which allows calculating a relative displacement between the steering wheel and the motor, from which a first steering wheel torque component may be estimated, in the form of a stiffness term modeling a spring connection between the steering wheel and the assist motor, and on the other hand, an angular speed information, which allows calculating a relative speed between the steering wheel and the motor, from which a second steering wheel torque component may be estimated, in the form of a dissipation term modeling a viscous damping type connection, the invention allows calculating the estimated steering wheel torque accurately while avoiding divergences of the calculation model, and thus enables the steering wheel torque calculation algorithm, and therefore more generally the process of regulating the steering assistance, to gain in stability.

Other objects, features and advantages of the invention will appear in more detail on reading the following description, using the appended drawings, provided for purely illustrative and non-limiting purpose, among which.

The invention concerns a method for managing a power steering device 1 for a vehicle 2, and more particularly for a motor vehicle 2 intended for passengers transportation.

Figure 1:
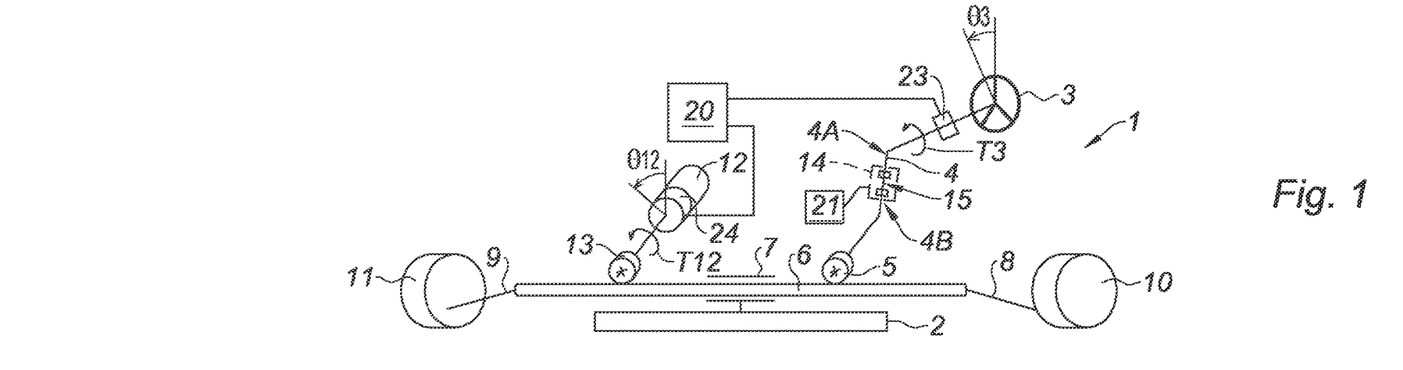
FIG. 1 illustrates, in a schematic representation, a steering device to which the invention is applied.

In a manner known per se, and as shown in FIG. 1, said power steering device 1 comprises a steering wheel 3 which allows a driver to maneuver said power steering device 1 by exerting a force, called «steering wheel torque» T3, on said steering wheel 3.

Said steering wheel 3 is preferably mounted on a steering column 4, guided in rotation on the vehicle 2, and which meshes, by means of a steering pinion 5, with a steering rack 6, which is itself guided in translation in a steering casing 7 fastened to said vehicle 2.

Preferably, each of the ends of said steering rack 6 is connected to a steering tie rod 8, 9 joined to the knuckle of a steered wheel 10, 11 (respectively a left wheel 10 and a right wheel 11), such that the longitudinal displacement in translation of the rack 6 allows modifying the steering angle (yaw angle) of the steered wheels.

Moreover, the steered wheels 10, 11 may preferably also be drive wheels.

The power steering device 1 also comprises an assist motor 12 intended to provide an assist force T12, and more particularly an assist torque T12, to assist the maneuver of said power steering device 1.

The assist motor 12 will preferably be an electric motor, with two operation directions, and preferably a rotary electric motor, of the brushless type.

The assist motor 12 may be engaged, where appropriate, via a reducer of a gear reducer type, either on the steering column 4 itself, to form a mechanism called «single pinion» mechanism, or directly on the steering rack 6, for example by means of a second pinion 13 distinct from the steering pinion 5 which allows the steering column 4 to mesh with the rack 6, so as to form a mechanism called «double pinion» mechanism, as illustrated in FIG. 1, or still by means of a ball screw which cooperates with a corresponding thread of said rack 6, at a distance from said steering pinion 5.

Figure 2:
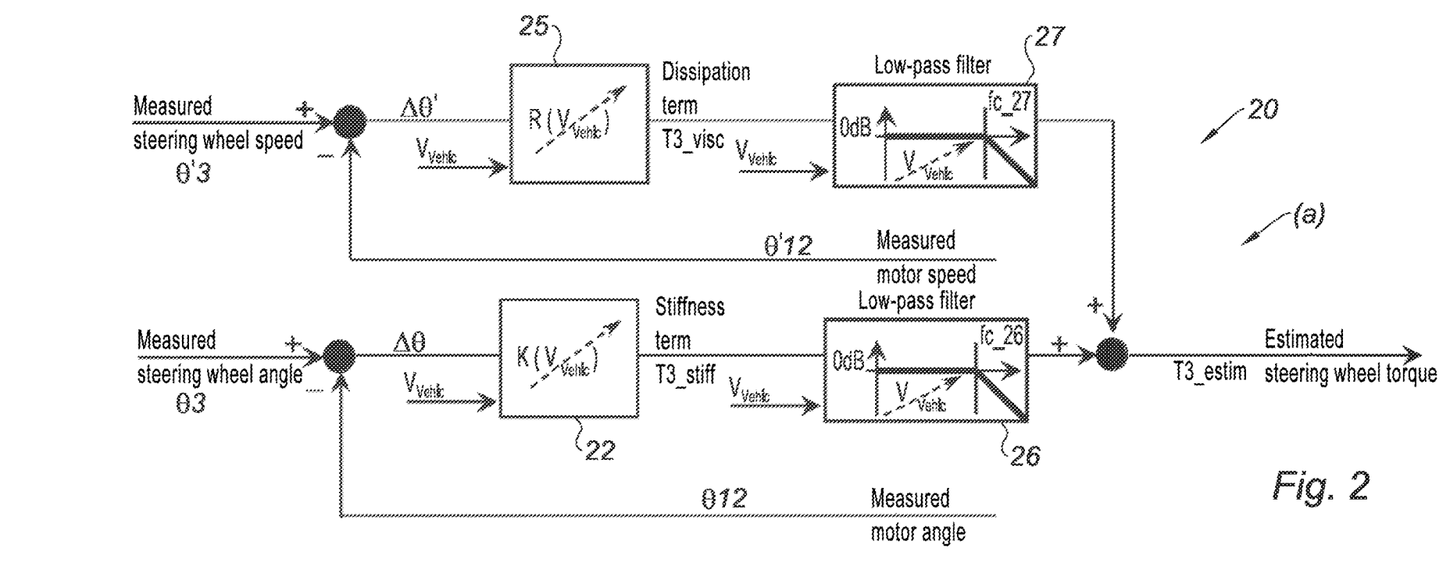
FIG. 2 illustrates, by means of a block diagram, a step (a) of reconstructing a steering wheel torque according to the invention.

According to the invention, and as illustrated in FIG. 2, the method comprises a step (a) of reconstructing a steering wheel torque during which the steering wheel torque T3 is evaluated, as it is actually exerted by the driver on the steering wheel 3, by reconstructing a representative information of said steering wheel torque, called «estimated steering wheel torque» T3_estim, from data called «external data» which are collected within the steering device 1 or within the vehicle 2, but excluding a steering wheel torque sensor 14 specifically dedicated to measuring of said steering wheel torque.

In other words, the steering wheel torque T3 is evaluated without using, or at the very least without the need to use, a possible steering wheel torque sensor 14 which would be specifically dedicated to measuring of said steering wheel torque T3, but by reconstructing information representative of said steering wheel torque, called «estimated steering wheel torque» T3_estim, from data called «external data» which are collected while excluding such a specific steering wheel torque sensor 14.

The external data used for estimating the steering wheel torque T3_estim will advantageously comprise, as will be detailed below, a value called «steering wheel angle» θ3 representative of the angular position of the steering wheel 3, a value called «motor angle» θ12 representative of the angular position of the shaft of the assist motor 12, as well as the time derivatives of said steering wheel angle and said motor angle (derivatives which may more particularly be calculated from the steering wheel angle and motor angle measured values).

The calculation which allows determining the estimated steering wheel torque T3_estim from the external data will be performed by an appropriate steering wheel torque reconstruction unit 20.

The external data may for example be made available to the steering wheel torque reconstruction unit 20, by the sensors or the concerned systems, on the on-board network CAN («Controller Area Network») of the vehicle 2.

As indicated above, the steering wheel torque reconstruction step (a) uses only but external data, that is to say, parameters, and in particular measured parameters, which are representative of the state of the steering device 1 and/or the state of the vehicle 2 at the considered moment, but which do not depend on the operation of a specific torque sensor 14, and which come from other members of the power steering device or other systems equipping the vehicle 2, and in particular which come from other sensors 23, 24 already present on said power steering device 1, and/or, respectively, already present on said other systems equipping the vehicle 2.

Thus, the invention advantageously allows maintaining in all circumstances reliable information, and substantially updated in real-time, as for the actual value of the steering wheel torque T3, and this including in case of failure of the specific torque sensor 14, even in case of pure and simple absence of a specific torque sensor 14, that is to say in practice independently of the presence and/or the proper operation of any torque sensor 14 which would be exclusively dedicated to measuring of the steering wheel torque T3 and installed to this end on the steering column 4.

Advantageously, the method according to the invention provides for collecting the necessary and sufficient external data for the evaluation of the estimated steering wheel torque T3_estim no longer via a specific torque sensor 14 but rather by means of third-party sensors 23, 24, which are also installed on the power steering device 1 or more generally on the vehicle 2 for a purpose other than that of measuring the steering wheel torque T3, that is to say, which also contribute to the achievement of at least one function (in particular a regulation function) other than the steering wheel torque reconstruction function (which amounts to an at least dual use of said third-party sensors, including a use for the estimation of the steering wheel torque and at least one other use).

By «specific steering wheel torque sensor» 14, is meant a sensor placed especially within the power steering device 1, for example on the steering column 4, in order to measure the steering wheel torque T3, and having for a main, and even exclusive, purpose the provision of a measurement of the steering wheel torque T3, regardless of the measurement technology used by said steering wheel torque sensor 14.

Thus, such a specific steering wheel torque sensor 14 may be formed by any subassembly which will comprise, on the one hand, an elastically torsion deformable member 15 (also called «test body»), such as a torsion bar 15, which is interposed axially between an upstream segment 4A of the steering column 4, carrying the steering wheel 3, and a downstream segment 4B of the steering column 4, carrying the steering pinion 5, so as to create an axial separation between said upstream segment 4A and said downstream segment 4B, said elastically deformable member 15 being intentionally less rigid in torsion, that is to say more easily elastically deformable in torsion, than the upstream 4A and downstream 4B segments of the steering column 4 which border it, so as to enable an elastic torsional deformation which is located mainly at the level of said elastically deformable member 15 and which is sufficiently large to be easily detectable, and on the other hand, at least one sensor member capable of, and sufficient to, generate a signal quantifying the magnitude of the torsional angular deformation of the elastically deformable member 15.

More particularly, and in a manner known per se, a specific steering wheel torque sensor 14 may comprise a two-part sensor member, a first part assigned to the upstream segment 4A, and a second part assigned to the downstream segment 4B, so as to be able, thanks to a measurement connection distributed in two axially spaced points and located on either side of the separation between the upstream segment 4A and the downstream segment 4B, to quantify the relative angular displacement of the upstream segment 4A relative to the downstream segment 4B, that is to say the torsional deformation of the elastically deformable member 15.

The specific steering wheel torque sensor 14, and therefore the different parts of its sensor member, might use any appropriate technology.

Thus, for example, the torque sensor 14 may be a magnetic flux variation sensor comprising a first part formed by a series of magnets with an alternating polarity, fastened to the upstream segment 4A, and a second part forming a magnetic flux collector, fastened to the downstream segment 4B, such that the polarity and the intensity of the magnetic flux measured at the output of the flux collector by a Hall effect probe indicates the direction and the amplitude of the relative displacement of the upstream segment 4A relative to the downstream segment 4B.

Alternatively, the first part of the sensor member may be arranged to measure the angular displacement of the upstream segment 4A whereas the second part of the sensor member measures the angular displacement of the downstream segment 4B of the steering column, on the other side of the elastically deformable member 15, the difference between these two angular displacements corresponding to the torsional deformation.

As indicated above, the method may preferably be used to manage a power steering device 1 within which the steering wheel 3 is mounted on a steering column 4 which meshes with a steering rack 6, and within which the assist motor 12 is engaged on said steering column 4 or on said steering rack 6.

Within such a device 1, the knowledge of the value of the steering wheel torque T3 is necessary for the management of the steering device 1, and more particularly for the servo-control of the assist motor 12.

According to a first possibility of implementation, corresponding to FIG. 1, said power steering device 1 will therefore include a specific steering wheel torque sensor 14 which is mounted on the steering column 4 and arranged to provide, in normal operation, a direct measurement of the steering wheel torque T3.

The steering wheel torque reconstruction step (a) may then advantageously automatically intervene, in an ad hoc manner, in case of a failure of the specific steering wheel torque sensor 14, to substitute an estimated steering wheel torque value T3_estim for the direct measurement of the steering wheel torque T3.

In other words, the steering wheel torque reconstruction according to the invention may be used in an auxiliary manner, as a palliative safety measure intended to ensure the continuity of the supply of the steering wheel torque information T3, and therefore the continuity of the operation of the steering assistance, in case of detection of a failure or a loss of reliability of the specific steering wheel torque sensor 14.

More particularly, the method may comprise, to this end, a supervision step during which the presence, and where appropriate, the reliability of the signal(s) originating from the specific steering wheel torque sensor 14 are respectively supervised and evaluated, then a switching step during which, if a failure of said steering wheel torque sensor 14 is detected, and in particular if the loss of the one or more signal(s) originating from the steering wheel torque sensor 14 is detected, the acquisition mode of the steering wheel torque T3 is modified so as to abandon the direct measurement ensured by the steering wheel torque sensor 14 to switch to a steering wheel torque reconstruction according to the invention, which provides an estimated steering wheel torque T3_estim from other external data.

The auxiliary circuit responsible for reconstructing the steering wheel torque (a circuit which comprises in particular the aforementioned reconstruction unit 20 and which may therefore, carry the same reference 20 in the following) is of course autonomous and independent of the main measurement circuit 21 which is associated to the torque sensor 14 and dependent on said specific torque sensor 14.

The aforementioned switching step therefore allows, where the need arises, disconnecting said main measurement circuit 21, and thus remove any link between the steering assistance and the defective torque sensor 14, to replace said main measurement circuit 21 by the auxiliary reconstruction circuit 20, which uses sources of information, and in particular third-party sensors 23, 24, which are distinct and totally independent of the steering wheel torque sensor 14 or the signals emitted (or no longer emitted) by the latter.

Advantageously, the redundant presence, and even use, on the one hand, of a main circuit 21 ensuring a direct measurement of a steering wheel torque T3 thanks to a specific steering wheel torque sensor 14 and, on the other hand, of an auxiliary circuit 20 ensuring a reconstruction T3_estim of the steering wheel torque by an estimation made from other (external) data, allows guaranteeing in all circumstances the provision of a reliable and actively updated information truly representative of the steering wheel torque T3, which significantly enhances the operational safety of the power steering device 1.

According to another (second) preferred possibility of implementation, the steering column 4 will be, on the contrary, devoid of any specific steering wheel torque sensor 14, and more particularly devoid of a torsion bar 15 intended to measure the steering wheel torque T3.

Such an arrangement would correspond to that of FIG. 1 on which the representation of the torque sensor 14 and of the torsion bar would be simply replaced by an uninterrupted steering column 4, and the corresponding measurement circuit 21 removed.

The steering wheel torque reconstruction step (a) (and therefore the reconstruction unit 20) may then be used in normal operation, permanently, to provide the steering wheel torque value (in this case the estimated steering wheel torque value T3_estim) which is necessary for the management of the power steering device 1, and more particularly for the servo-control of the assist motor 12.

In other words, according to this second possibility of implementation, a power steering device 1 is used within which the steering wheel torque sensor 14, and more particularly the corresponding torsion bar 15, which is usually placed on the steering column 4, is removed and replaced with a torque reconstruction circuit 20 allowing estimating the steering wheel torque T3_estim based on external data, in accordance with the invention.

Advantageously, the steering wheel torque reconstruction step (a) is indeed reliable enough to be mainly used by default, and even as a single means, to evaluate the actual value of the steering wheel torque T3, by calculating an estimated steering wheel torque value T3_estim actually representative of said steering wheel torque T3, that is to say, to some extent, in order to indirectly "measure" the steering wheel torque T3, and then to enable, among others, an active servo-control of the assist motor 12 on the basis of said estimated steering wheel torque value T3_estim.

According to this second possibility of implementation, it is therefore possible to achieve structural saving of a hardware steering wheel torque sensor 14 (for the benefit of a virtual sensor capable of reconstructing the same steering wheel torque information T3 from external third-party data), and thus obtain in a cost-effective manner a compact and lightweight power steering device 1, both reliable and effective.

Ultimately, the invention will allow knowing the value of the steering wheel torque T3 within a power steering device 1 even though said device 1, and more particularly the steering column 4 of said device 1, is devoid of a steering wheel torque sensor 14 (and more particularly of a torsion bar 15), or still better the device 1, although having a specific steering wheel torque sensor 14, is (temporarily or permanently) deprived of the use of such a steering wheel torque sensor 14.

Of course, any parameter or any combination of parameters may be used as external data, which has(have) an origin other than a specific steering wheel torque sensor 14 and which nevertheless carries(carry) exploitable information to reconstruct, by means of an appropriate mathematical model, a value T3_estim representative of the steering wheel torque T3.

During the steering wheel torque reconstruction step (a), as illustrated in FIG. 2, and according to a preferred feature which may constitute an invention on its own, and in particular which is applicable both when the method according to the invention is used punctually as a backup system to substitute for a defective steering wheel torque sensor 14 and when said method is permanently used as a main, or still exclusive, means for measuring the steering wheel torque T3, on the one hand, a value called «steering wheel angle» θ3 representative of the angular position (yaw angle) of the steering wheel 3, and on the other hand, a value called «motor angle» θ12 representative of the angular position of the shaft of the assist motor 12 are collected as external data, the difference, called «relative displacement» Δθ=θ3−θ12, between the steering wheel angle θ3 and the motor angle θ12 is calculated, and then the relative displacement Δθ is multiplied by a predetermined stiffness coefficient K, so as to obtain a first component of the estimated steering wheel angle, called «stiffness term» T3_stiff:

$$T3\_stiff = K \times \Delta\theta = K \times (\theta 3 - \theta 12)$$

The stiffness coefficient K will be provided by a stiffness chart (also called «cartography» or «map») stored in a non-volatile memory of a stiffness term calculation unit 22 of the steering wheel torque reconstruction unit 20.

Said stiffness coefficient K will be representative of a (torsion) spring-like elastic torsional deformation behavior between the steering wheel 3 and the shaft of the assist motor 12.

Preferably, the steering wheel angle θ3 (first external data) is measured by means of a steering wheel angular position sensor 23 which is associated to the steering wheel 3.

The steering wheel angular position sensor 23 will advantageously correspond to a "manufacturer" sensor which is integrated, from the outset, to the vehicle 2 by the manufacturer of said vehicle, at the level of the subassembly which carries the steering wheel 3 and to which the steering column 4 will be connected.

Hence, this sensor 23 is systematically already present by default within the vehicles 2.

The exploitation of such a sensor 23 for the purposes (additional, in addition to the reasons for which this sensor is initially provided) of indirectly determining, by reconstruction, the steering wheel torque T3, advantageously allows dispensing with a specific steering wheel torque sensor 14, and where appropriate, lightening the structure of the power steering device 1 by purely and simply renouncing with the installation of an additional specific steering wheel torque sensor 14.

The steering wheel angular position sensor 23 may in particular be a magneto-resistive type sensor or still a Hall effect sensor.

Preferably, the motor angle θ12 is in turn measured by means of a motor angular position sensor 24, for example of the resolver type, which is integrated, by construction, into the assist motor 12.

Herein again, the use (and more specifically the extension of use) of an integrated sensor 24, systematically present by default in the power steering device 1, herein in the assist motor 12, and initially provided for other uses, allows saving an additional torque sensor 14.

As a first approximation, and more particularly when the vehicle 2 is travelling at a high speed Vvehic, typically higher than 50 km/h, it might be possible to assimilate, from a functional point of view, the estimated steering wheel torque T3_estim with the (sole) stiffness term T3_stiff mentioned above, that is to say to consider that: T3_estim=T3_stiff.

Indeed, the accuracy and stability of the steering wheel torque estimation could be considered to be sufficient, in practice, under such conditions.

Nonetheless, according to a preferred feature which may constitute an invention on its own, and as shown in FIG. 2, at the steering wheel torque reconstruction step (a), the time derivative θ'3=d(θ3)/dt of the steering wheel angle θ3 is calculated to estimate the rotational angular speed of the steering wheel, called «steering wheel speed» θ'3, the time derivative θ'12=d(θ12)/dt of the motor angle θ12 is calculated to estimate the rotational angular speed of the shaft of the assist motor 12, called «motor speed» θ'12, the difference, called «relative speed» Δθ', between the steering wheel speed and the motor speed: Δθ'=θ'3−θ'12 is calculated, and then the relative speed Δθ' is multiplied by a predetermined viscosity coefficient R, so as to obtain a (second) component of the estimated steering wheel angle, called «dissipation term» T3_visc:

$$T3\_visc = R \times \Delta\theta' = R \times (\theta'3 - \theta'12)$$

This second component of the estimated steering wheel angle, called «dissipation term» T3_visc, intervenes in the determination of the estimated steering wheel torque T3_estim, and, more preferably, is added to the stiffness term T3_stiff to obtain the estimated steering wheel torque T3_estim:

$$T3\_estim = T3\_stiff + T3\_visc$$

In other words, the estimated steering wheel torque T3_estim is preferably determined as being the sum of a stiffness term T3_stiff and of a dissipation term T3_visc.

Advantageously, the use of a dissipation term T3_visc, herein preferably in addition to the stiffness term T3_stiff, allows in practice avoiding the divergence of the calculation model of the estimated steering wheel torque T3_estim, and thus gaining in stability, in particular when the vehicle is travelling at low speed, typically at less than 50 km/h.

The dissipation coefficient R will be provided by a dissipation chart (also called «cartography» or «map») stored in a non-volatile memory of a dissipation term calculation unit 25 of the steering wheel torque reconstruction unit 20.

Said dissipation coefficient R will be representative of a damping-type torsional viscous behavior between the steering wheel 3 and the shaft of the assist motor 12.

Thus, the steering wheel torque reconstruction step (a) may ultimately use a spring-damper type model to calculate, by the aforementioned sum, the estimated steering wheel torque T3_estim=T3_stiff+T3_visc.

It will be noted that, in order to express the motor angle θ12 in the same reference frame as the steering wheel angle θ3 (to allow a homogeneous calculation of the relative displacement Δθ), respectively in order to express the motor speed θ'12 in the same reference frame as the steering wheel speed θ'3 (to allow a homogeneous calculation of the relative speed Δ'θ), where appropriate, the transmission ratios of the different kinematic connections which connect the assist motor 12 to the steering column 4 and to the steering wheel 3, and in particular the reduction ratio of a possible reducer associated to the assist motor 12, or the transmission ratio between the rack 6 and the pinion(s) 5, 13 will be taken into account.

Figure 5:
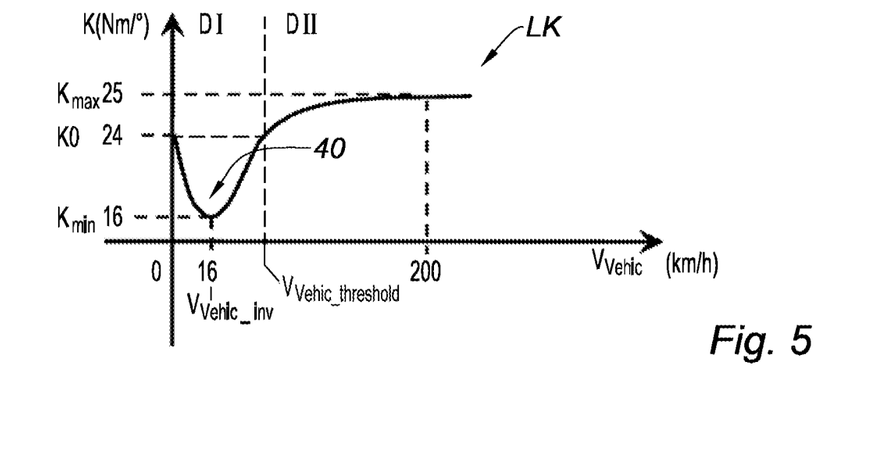
FIG. 5 illustrates an example of an evolution law of the used stiffness coefficient, depending on the speed of the vehicle.

Preferably, and as illustrated in FIGS. 2 and 5, the stiffness coefficient K is adjusted depending on the longitudinal speed Vvehic of the vehicle 2.

In particular, such an adjustment allows optimizing (in terms of response time, accuracy and stability), depending on the running conditions, the static and dynamic responses of the steering wheel torque reconstruction, and more generally the static and dynamic responses of the servo-control of the assist motor 12 which results from said steering wheel torque reconstruction.

Preferably, and as illustrated in FIG. 5, the stiffness coefficient K follows an evolution law depending on the speed of the vehicle Vvehic, called «stiffness law» LK, according to which the stiffness coefficient K first decreases (in absolute value), relative to its initial (non-zero) value K0 associated to a zero speed Vvehic, before reaching a minimum Kmin associated to a speed Vvehic called inversion speed Vvehic_inv, and then gradually increases again (in absolute value) with the speed, so as to reach again and then exceed the initial value K0 from and beyond a speed Vvehic called threshold speed Vvehic_threshold, which marks the boundary between a first speed interval, called «low-speed range» denoted DI, which ranges from zero to the selected threshold speed Vvehic_threshold, and (at least) one second speed interval, called «high-speed range» denoted DII, which ranges from and beyond said threshold speed Vvehic_threshold, to the maximum speed of vehicle.

The threshold speed Vvehic_threshold, will be arbitrarily selected, for example empirically, but so as to be representative of a transition between low speeds and high speeds, and more particularly of a transition between a «parking» mode, corresponding to speeds adapted to parking maneuvers, and a «running» mode corresponding to speeds usually reached when the vehicle is travelling, on road, highway or even on circuit.

Thus, said threshold speed Vvehic_threshold will preferably be selected equal to or lower than 50 km/h, and more particularly between 30 km/h and 35 km/h, and for example close to 32 km/h as illustrated in FIG. 5.

Preferably, and as illustrated in FIG. 5, the stiffness law LK therefore has a well 40 for the low speed values, such that, in the low-speed range DI, the stiffness coefficient K remains lower than the values that it adopts in the high-speed range DII, and passes into said low-speed range DI by a minimum Kmin which preferably corresponds to an overall minimum (lower extremum) of the stiffness law LK.

The stiffness minimum Kmin will preferably be reached for an inversion speed Vvehic_inv which will be comprised between 10 km/h and 25 km/h, and for example substantially equal to 16 km/h, as illustrated in FIG. 5.

It should be noted that, in practice, said inversion speed Vvehic_inv may substantially be half the threshold speed Vvehic_threshold.

Preferably, the stiffness law LK will have, as indicated by the curve of FIG. 5:
- a first portion (strictly) decreasing, preferably convex, between a starting point (0, K0) which associates to a zero speed value Vvehic (that is to say to a parked or stationary vehicle) an initial stiffness K0 (non-zero, and herein amounting to 24 Nm/degree in FIG. 5), and a minimum (Vvehic_inv, Km in) which associates to the inversion speed Vvehic_inv, when it is reached, a stiffness minimum Kmin (herein amounting to 16 Nm/degree),
- then a second portion (strictly) increasing, preferably convex, between said minimum (Vvehic_inv, Kmin) and a transition point (which may correspond to an inflection point of the curve representative of the stiffness law LK), which associates to the threshold speed Vvehic_threshold a stiffness value close to or equal to the value of the initial stiffness K0,
- then a third increasing portion, preferably with a slope lower than the (average) slope of the second portion, and preferably concave, which tends, when the speed Vvehic tends towards the maximum possible speed of the vehicle, towards an asymptotic stiffness value (stiffness maximum) Kmax higher than the initial stiffness value K0 (and herein amounting to 25 Nm/degree).

Preferably, the stiffness law LK is a continuous, and continuously differentiable, function that is to say of class C1.

Advantageously, the regularity of the stiffness function LK (in particular between the low-speed DI and high-speed DII ranges), as well as the reduction of the stiffness K that said stiffness law LK imposes in the low-speed range DI (by the presence of the well 40), confers stability and continuity to the calculation of the estimated torque T3_estim, and thus improves the management of the transitions between a parking situation and a running situation (and vice versa).

Indeed, the inventors have found that the static and dynamic behaviors of the vehicle 2, and consequently of the servo-controlled power steering device 1, are very different depending on whether the vehicle is in a parking situation or in a running situation.

Indeed, at low speeds, and more particularly in parking, the behavior of a tire which dresses a wheel 9, 10 is similar to a dry friction behavior, while in a running situation, and therefore at high speed, typically beyond 50 km/h, and therefore in particular from and beyond the aforementioned threshold speed Vvehic_threshold (that is to say in the aforementioned high-speed range DII), the tire behaves, in its linear behavior area, as a simple stiffness.

The stability limits of the servo-control of the steering device 1, and more particularly the stability limits of the algorithms of calculation and then of use of the estimated steering wheel torque T3_estim, are therefore different in parking and in running.

To the extent that the stiffness K intervenes directly in the definition of said stability limits, it is in particular useful to vary said stiffness depending on the situation of the vehicle, and more particularly to modify said stiffness K (and therefore to confer a different stiffness value K) depending on whether the vehicle is in a parking state (zero speed), in a running state (at high speed, in particular in the aforementioned high-speed range DID or in a transition between these two states (typically in the aforementioned well 40, and in particular from and beyond the inversion speed Vvehic_inv, in the low-speed range DI), in order to guarantee the stability of the servo-control.

Respectively, alternatively or complementarily to the adjustment of the stiffness coefficient K depending on the speed of the vehicle, the viscosity coefficient R is preferably adjusted depending on the longitudinal speed Vvehic of the vehicle 2.

Herein again, such an adjustment allows in particular optimizing (in terms of response time, accuracy and stability) the static and dynamic responses of the steering wheel torque reconstruction, and more generally of the servo-control of the assist motor 12 which results therefrom, depending on the running conditions.

As example, the viscosity coefficient R may be reduced, even canceled, when the speed of the vehicle Vvehic reaches or exceeds a predetermined speed threshold, for example 50 km/h, beyond which the need for stability is lower than at low speeds (between 0 km/h and 50 km/h).

Figure 6:
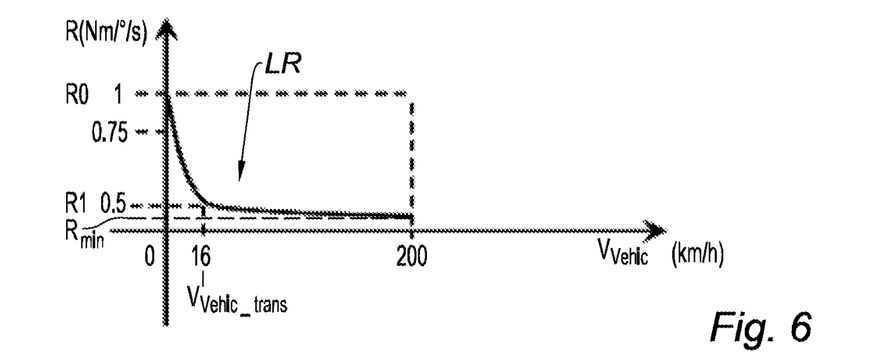
FIG. 6 illustrates an example of an evolution law of the used viscosity coefficient, depending on the speed of the vehicle.

More particularly, as illustrated in FIG. 6, the viscosity coefficient R may follow an evolution law, called «viscosity law» LR, decreasing depending on the speed of the vehicle Vvehic.

Preferably, according to this viscosity law LR, the viscosity coefficient R may decrease (in absolute value) continuously depending on the speed Vvehic, first strongly, according to a first portion of a decreasing function of the speed, substantially linear or even slightly convex, from an initial value R0 (non-zero, and herein amounting to 1 N·m/degree/s in FIG. 6) associated to a zero speed to an intermediate value R1 associated to a speed called «transition speed» Vvehic_trans, then less strongly, according to a second portion of a decreasing function, substantially linear or slightly convex, having a lower average slope than the first portion, and which leads progressively to a minimum viscosity value Rmin, preferably asymptotic.

The transition speed Vvehic_trans will preferably be comprised between 10 km/h and 25 km/h, and for example substantially equal to 16 km/h. In a particularly preferred manner, it will be substantially equal to the inversion speed Vvehic_inv of the stiffness law LK, so that the stiffness minimum Kmin will correspond to the intermediate viscosity R1.

The intermediate viscosity R1 may substantially represent half (i.e. about 50%) of the initial viscosity R0, and the minimum viscosity Rmin between 30% and 45% of said initial viscosity R0.

Similarly, as has been explained above for the stiffness law LK, the viscosity law LR is preferably a continuous, and continuously differentiable, function that is to say of class C1.

Moreover, as illustrated in FIG. 2, the stiffness term T3_stiff («spring» component) is preferably filtered by means of a (first) low-pass filter 26.

The low-pass filtering advantageously allows reducing or even eliminating the noise.

Preferably, the cut-off frequency fc_26 of said first low-pass filter 26 is adjusted according to the longitudinal speed Vvehic of the vehicle.

Advantageously, the adjustment of the cut-off frequency fc_26 allows optimizing the static and dynamic responses of the torque reconstruction and of the servo-control of the assist motor 12 resulting therefrom.

Figure 7:
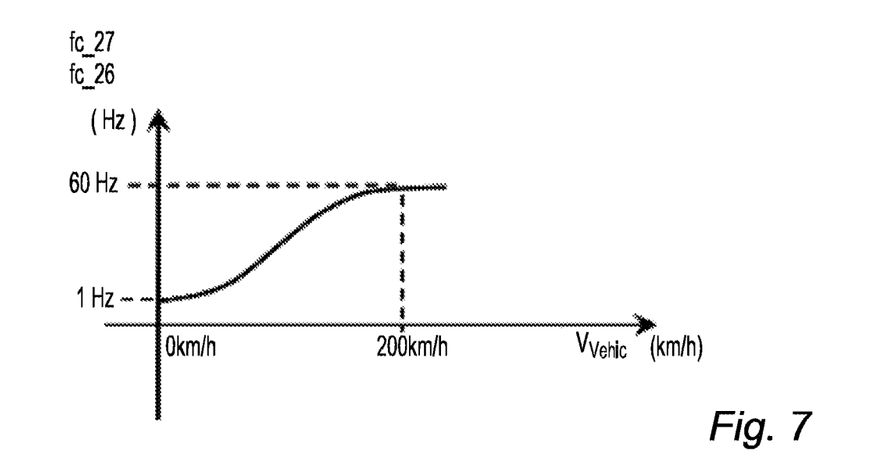
FIG. 7 illustrates an example of an evolution law, depending on the speed of the vehicle, with cut-off frequencies of low-pass filters used to filter the stiffness term and/or the dissipation term calculated according to the invention.

As example, and as illustrated in FIG. 7, the cut-off frequency fc_26 will increase according to an increasing function of the speed of the vehicle, which advantageously ensures the stability of the steering wheel torque estimation calculation regardless of the speed.

More particularly, the cut-off frequency fc_26 will take on a low value (typically less than 10 Hz, or even less than 5 Hz, and for example in the range of 1 Hz) for low speeds (typically between 0 km/h and 25 km/h), or even 30 km/h, and more particularly in the aforementioned low-speed range DI).

Indeed, the difference in behavior of the vehicle 2 and of the power steering device 1 depending on whether the vehicle is parked or running, and the implications of this difference in behavior in terms of stability, may induce, at low speed, and if the cut-off frequency fc_26 of the first low-pass filter 26 is too high, oscillations of the steering wheel torque that is felt by the driver through the steering wheel 3.

To avoid such a driving discomfort, it is therefore useful to reduce said cut-off frequency fc_26 at low speeds.

In contrast, the cut-off frequency fc_26 will take a high value, higher than the low value, and typically higher than 10 Hz, or even 20 Hz or 30 Hz, and being able to reach 60 Hz, for high speeds (typically beyond 30 km/h, and more generally in the high speed range DII).

Indeed, a too low cut-off frequency value generates a delay (phase shift) between the obtainment of the estimated steering wheel torque T3_estim and the actual steering wheel torque T3 applied by the driver, which results in inconveniences in terms of feeling of the steering by the driver, the steering seeming to lack responsiveness, and present some «heaviness» or some «softness».

In contrast, at low speed, this delay phenomenon is less perceptible, which allows a lowering of the cut-off frequency fc_26 without impairing the driving comfort.

Respectively, alternatively or complementarily to the filtering of the stiffness term T3_stiff, the dissipation term T3_visc («viscous damper» component) is preferably filtered by means of a (second) low-pass filter 27, whose cut-off frequency fc_27 is preferably adjusted according to the longitudinal speed of the vehicle Vvehic.

Herein again, the low-pass filtering advantageously allows reducing or eliminating the noise, whereas the adjustment of the cut-off frequency fc_27 allows optimizing the static and dynamic responses of the torque reconstruction and of the servo-control of the assist motor 12 resulting therefrom.

It should be noted that the second low-pass filter 27 associated to the dissipation term T3_visc also influences the tactile feeling inferred to the driver through the steering wheel 3.

As such, it should be noted that it is possible, for example, to reduce the cut-off frequency fc_27 when the speed of the vehicle Vvehic is lower than or equal to a threshold characterizing «low speeds», for example lower than or equal to a threshold of 50 km/h, and more particularly in the aforementioned low-speed range DI, in particular in order to avoid giving the driver a heaviness sensation, that is to say a viscous behavior sensation of the power steering, during the steering wheel 3 maneuvers.

More particularly, the cut-off frequency fc_27 may follow an evolution law identical to that described above with reference to FIG. 7.

The cut-off frequency fc_27 of the second low-pass filter may, where appropriate, be equal to the cut-off frequency fc-26 of the first low-pass filter.

Figure 3:
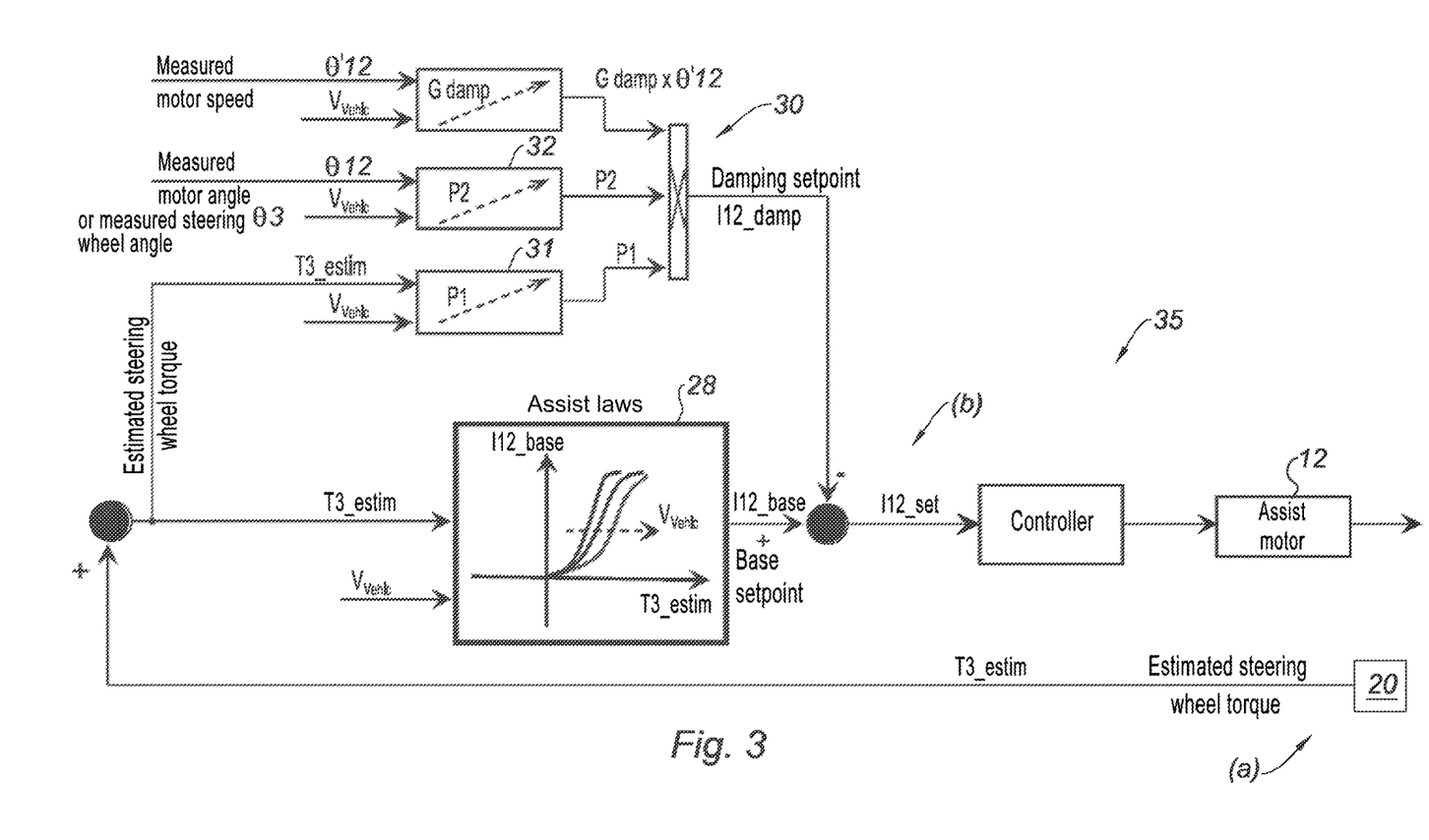
FIG. 3 illustrates, by means of a block diagram, an example of implementing the invention within an open-loop regulation method of the assist motor.

According to a variant, illustrated in FIG. 3, the method comprises, after the torque reconstruction step (a), a step (b) of open-loop regulation of the assist motor 12, during which a motor torque setpoint I12_set that is applied to the assist motor 12 is determined.

Such an open-loop servo-control, also called servo-control by «boost curves», known per se, consists in determining, from the known value of the steering wheel torque T3 (herein from the estimated steering wheel torque T3_estim coming from the reconstruction unit 20), a motor torque setpoint I12_set, which may be expressed in an equivalent and preferential manner in the form of a motor current setpoint I12_set, which is applied to the assist motor 12.

In this case, the motor torque setpoint I12_set comprises on the one hand a base setpoint I12_base, which is determined from the estimated steering wheel torque T3_estim, according to predefined assist laws («boost curves») 28, and on the other hand, a damping setpoint (or «damping torque») I12_damp, which is calculated, according to a preferred feature which may constitute an invention on its own, depending on the rotational angular speed of the shaft of the assist motor θ'12 (called hereinafter «motor speed»), and which serves to adjust the base setpoint I12_base.

To this end, said damping setpoint I12_damp is preferably algebraically added to said base setpoint I12_base, such that the motor torque setpoint I12_set corresponds to the algebraic sum of the base setpoint and the damping setpoint.

The contribution of the damping setpoint I12_damp aiming at improving the stability of the open-loop servo-control, and therefore potentially having a moderating (reducing) effect on the motor torque setpoint I12_set, by simple representation convention, a positive sign will be assigned to the base setpoint I12_base and a negative sign will be assigned to the damping setpoint I12_damp, such that the aforementioned algebraic sum is written in the form of a subtraction:

$$I12\_set = I12\_base - I12\_damp$$

The assist laws 28 will be stored in the form of a chart or «cartography» («map») in a non-volatile memory of a corresponding calculation unit of the power steering device 1.

In a manner known per se, said assist laws 28 will associate, according to an increasing function, a motor torque base setpoint I12_base to each (estimated) steering wheel torque value T3_estim.

Said assist laws 28 may also be adjusted depending on the speed Vvehic of the vehicle, typically in order to increase the assistance at a low speed (for example to facilitate the parking maneuvers of the vehicle) and conversely to reduce the assistance at a higher speed, in particular beyond 50 km/h, and more particularly in the aforementioned high-speed range DII (the resistance of the steering to the steering maneuvers being indeed generally less significant at high speed).

As illustrated in FIG. 3, the damping setpoint I12_damp will, in turn, preferably be calculated, within a damping unit 30, from the motor speed θ'12, and more particularly proportionally to the motor speed θ'12, by applying a damping gain Gdamp to the motor speed θ'12, which will preferably be obtained by derivation of the motor angle θ12 as described above.

The interest of such an arrangement will be better understood by reading the following.

When a power steering device is open-loop servo-controlled, based on a (direct) measurement of the steering wheel torque T3, it is indeed known to stabilize the servo-control by a damping which uses a steering wheel torque derivative feedback.

However, such a known method requires in practice measuring the steering wheel torque T3 directly by means of a steering wheel torque sensor 14, not only so that the information on the value of the steering wheel torque T3 is available, but also so that the corresponding signal is acquired over a sufficiently wide bandwidth (typically of at least 100 Hz) so that the subsequent calculation obtained by deriving this torque signal to obtain the derivative of the steering wheel torque does not have any instability therein.

However, no direct measurement of the steering wheel torque T3 is herein available (due to failure or absence of the torque sensor 14), and the reconstruction unit 20 of the estimated steering wheel torque T3_estim having a relatively narrow bandwidth (and therefore insufficient to prevent the occurrence of instabilities, in particular between 15 Hz and 25 Hz), the known damping method is not applicable as such.

In contrast, the inventors have found that the estimated motor torque reconstruction T3_estim, which is representative of the steering wheel torque T3, has been performed, according to the invention, from (among others) the motor angle θ12, that is to say that there has been a link associating the steering wheel torque T3 and the motor angle θ12, and have discovered that it was possible, by extension, to also establish a representativeness link between the respective derivatives of these quantities, that is to say to establish a link associating the derivative of the motor angle, and therefore the motor speed θ'12, with a torque derivative form.

Consequently, the inventors have discovered that it has been actually possible to use the motor speed θ'12 (rather than the derivative of the estimated steering wheel torque T3_estim), calculated by deriving the measured motor angle θ12, as a base signal in order to calculate an effective damping feedback, that is to say to calculate a damping setpoint I12_damp both relevant and stable.

Advantageously, the derivative of the motor angle, that is to say the motor speed $\theta'12$, while being (indirectly) representative of the derivative of the steering wheel torque T3, does not actually have, unlike a steering wheel torque derivative which would be calculated by deriving the estimated steering wheel torque T3_estim, a bandwidth restriction which would be severe enough to introduce an instability of the open-loop servo-control within the target frequency range.

The damping gain Gdamp (or «derivative gain»), that the damping unit 30 determines and applies to the motor speed $\theta'12$, may in turn be advantageously adjusted depending on the speed of the vehicle Vvehic.

More particularly, it will be possible to increase the damping gain Gdamp at low speeds (lower than 50 km/h, and more particularly in the aforementioned low-speed range DI) and to reduce said damping gain Gdamp beyond, at high speeds (typically in the high-speed range DII), so as to obtain more damping, and therefore more stability, at low speeds than at high speeds.

Preferably, and as illustrated in FIG. 3, the damping setpoint I12_damp is, moreover, weighted by at least one first weighting coefficient P1 which depends on the value of the estimated steering wheel torque T3_estim.

This first weighting coefficient P1 is defined by a first weighting unit 31, in order to distinguish a situation called «held steering wheel» situation, in which the driver holds the steering wheel 3 in hand, from a situation called «released steering wheel» situation, in which the driver has released the steering wheel 3, and to adapt the damping setpoint I12_damp accordingly.

The objective is to reduce the first weighting coefficient P1, and therefore the contribution of the damping setpoint I12_damp in the definition of the motor torque setpoint I12_set, when it is in a held steering wheel situation.

Such a held steering wheel situation is characterized by a steering wheel torque T3, and therefore a relatively high (typically equal to or higher than 2 N·m) estimated steering wheel torque T3_estim.

By reducing (in absolute value) the first weighting coefficient P1 in a held steering wheel situation, it is advantageous to avoid inferring to the driver, through the steering wheel 3, a tactile sensation of viscosity and lack of responsiveness of the power steering device.

Conversely, the first weighting coefficient P1 will be increased (in absolute value) when it is in a released steering wheel situation, which is characterized by a steering wheel torque T3, and therefore a relatively low (typically equal to or lower than 1 N·m) estimated steering wheel torque T3_estim.

In this manner, the free oscillations of the steering wheel 3 may advantageously be damped and in particular the steering wheel 3 may be prevented from being subject to rapid, high-amplitude, uncontrolled angular bursts and of large amplitude, which might for example cause a yawing of the vehicle before the driver could react and take said steering wheel 3 in hand.

As example, the first weighting coefficient P1 may vary on a scale ranging from zero to one, the value one being applied if the estimated steering wheel torque T3_estim is equal to or lower than 1 N·m, the value zero being applied if the estimated steering wheel torque T3_estim is equal to or higher than 2 N·m, and an appropriate overall decreasing function, for example linear, being used to vary, depending on the estimated steering wheel torque T3_estim, said first weighting coefficient P1 between these two values.

It should be noted that the first weighting coefficient P1 may also vary with the speed of the vehicle Vvehic.

Preferably, as illustrated in FIG. 3, the damping setpoint I12_damp is (also) weighted by a second weighting coefficient P2 which depends on the motor angle $\theta12$, and/or equivalently or complementarily, and preferably, which depends on the steering wheel angle $\theta3$.

In this regard, it should be noted that, for the purposes of calculating said second weighting coefficient P2, the steering wheel angle $\theta3$ and the motor angle $\theta12$ may provide a substantially equivalent angular position information, provided that, where appropriate, the overall transmission ratio of the different kinematic connections which connect the assist motor 12 to the steering column 4 and to the steering wheel 3, are taken into consideration.

This second weighting coefficient P2, defined by a second weighting unit 32, will allow taking into account the possible deviation of the steering wheel 3 relative to its central position (corresponding to the situation in which the vehicle is moving in straight line, or in the vicinity of the straight line).

Said second weighting coefficient P2 will thus be higher when the motor angle $\theta12$, and/or respectively the steering wheel angle $\theta3$, will be low, or even zero, that is to say when the steering wheel 3 will be in the vicinity of its central position (that is to say when the vehicle will follow a trajectory close to the straight line), whereas said second weighting coefficient P2 will be lower when the motor angle $\theta12$, and/or respectively the steering wheel angle $\theta3$, will increase and/or exceed a predetermined amplitude threshold, so that the damping does not interfere with the natural recentering movement of the steering wheel 3 after a steering maneuver.

Moreover, herein again, the second weighting coefficient P2 may be adjusted depending on the speed of the vehicle, and more particularly by following a decreasing function of said speed of the vehicle, that is to say by decreasing (in absolute value) said second weighting coefficient P2 when the speed of the vehicle Vvehic increases.

Finally, the damping setpoint I12_damp may be determined by the formula:

$$I12\_damp = P2 \times P1 \times Gdamp \times \theta'12.$$

Figure 4:
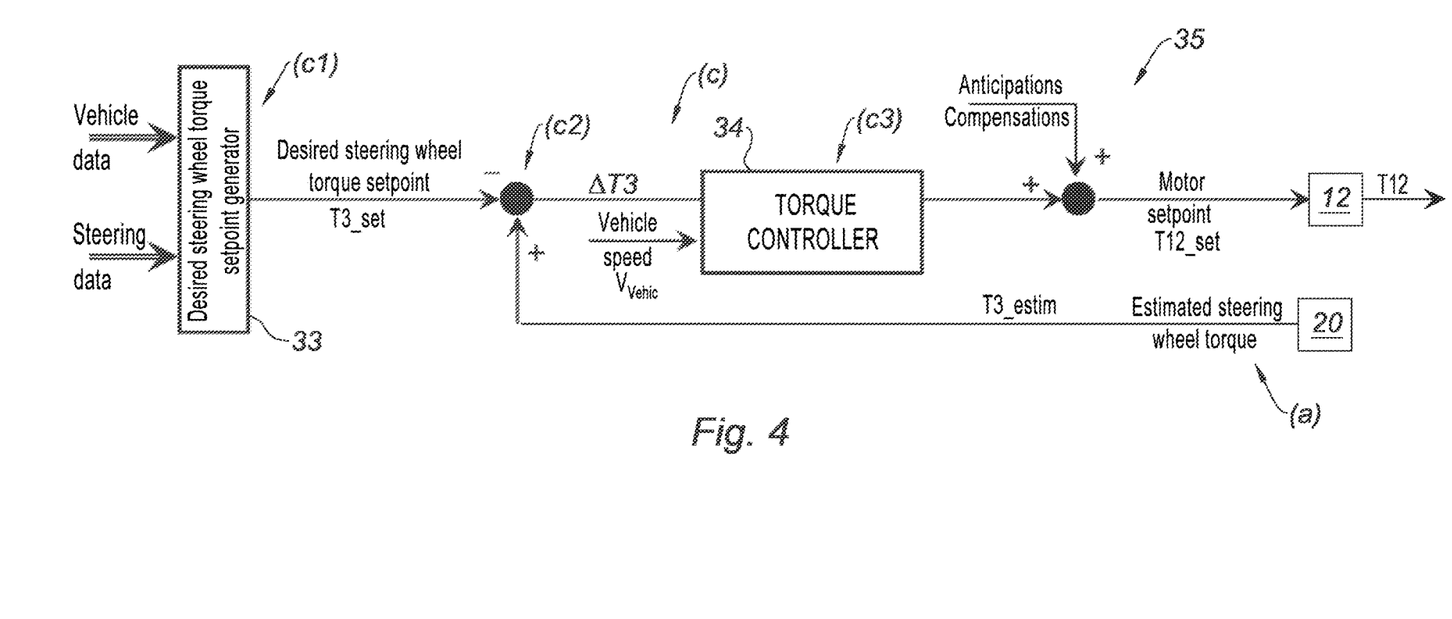
FIG. 4 illustrates, by means of a block diagram, an example of implementing the invention within a closed-loop regulation method of the assist motor.

According to another variant illustrated in FIG. 4, the method comprises, after the torque reconstruction step (a), a step (c) of closed-loop regulation of the assist motor 12, during which a motor torque setpoint (or, in an equivalent manner, a motor current setpoint) T12_set that is applied to the assist motor 12 is determined.

Preferably, this closed-loop regulation uses the steering wheel torque T3 as a servo-controlled parameter.

As such, the method may comprise a step (c1) of defining a steering wheel torque setpoint, during which a steering wheel torque setpoint T3_set torque is generated, which is representative of a steering wheel torque value T3 to be reached.

The steering wheel torque setpoint T3_set will be generated, in real-time, by a steering wheel torque setpoint generating unit 33, according to predefined assist laws, which may typically be in the form of cartographies or «maps», and which associate to each service life situation of the vehicle 2, a steering wheel torque setpoint T3_set which corresponds to the steering wheel torque T3 that should be felt at the steering wheel 3 at the considered moment, taking into account said service life situation of the vehicle.

To this end, the steering wheel torque setpoint generating unit 33 uses, as input, on the one hand, «vehicle data», representative of the dynamic situation of the vehicle 2 at the considered moment, such as the longitudinal speed of said vehicle Vvehic, the lateral acceleration of said vehicle, etc., and on the other hand, «steering data», representative of the configuration of the power steering device 1 at the considered moment, such that the steering angle, the rotational speed θ'3 of the steering wheel 3, etc., from which data said generating unit 33 determines the steering wheel torque setpoint T3_set.

Afterwards, the method comprises a step (c2) of determining a steering wheel torque error during which the difference, called «steering wheel torque error» ΔT3, between the steering wheel torque setpoint T3_set and the actual value of the steering wheel torque is calculated, which is herein known by the estimated steering wheel torque value T3_estim obtained during the steering wheel torque reconstruction step (a) (rather than through a measurement by means of a specific sensor 14).

In other words, the steering wheel torque reconstruction step (a), according to the invention herein allows «closing» the servo-control loop by ensuring, by reconstruction, the equivalent of an indirect measurement of the servo-controlled quantity, namely of the steering wheel torque T3.

Afterwards, the method comprises a step (c3) of determining the motor torque setpoint during which, a motor torque setpoint T12_set which is intended to be applied to the assist motor 12, is generated by means of a motor torque setpoint determination unit 34 (or «torque controller»), so that the assist motor 12 could act so as to reduce the steering wheel torque error ΔT3.

In other words, in application of the motor torque setpoint T12_set, the assist motor 12 will deliver an assist torque T12 which will allow converging the actual steering wheel torque T3 towards the target value constituted by the steering wheel torque setpoint T3_set, which will result in reducing the torque error ΔT3 (that is to say, bringing it close to zero).

Moreover, according to a possible variant, it is also possible to add, preferably by algebraic sum, corrective components, such as an anticipation component and/or a compensation component, to form, in fine, the motor torque setpoint T12_set which is then applied to the assist motor 12.

An «anticipation component», also called «prepositioning component», is an offset-type corrective component which is first introduced into the motor torque setpoint T12_set, typically to increase the magnitude of said motor torque setpoint T12_set, when it is known in advance, even before applying the motor torque setpoint T12_set to the assist motor 12, that the steering system will not behave exactly as desired.

As example, if the occurrence of a non-zero static error whose value is known, is systematically observed, the anticipation component will allow increasing the motor torque setpoint T12_set by an (offset) value corresponding to said static error.

For example, a «compensation component» may, in turn, be intended to compensate for the dry friction effects or still the inertia effects of the steering mechanism.

In the case of dry frictions, it will be possible to calculate an estimated value of said frictions, by any appropriate means, and then apply a friction compensation component whose value will correspond to said estimated value of the frictions.

In the case of inertia, which tends to induce a delay in the reaction of the system, it will be possible, for example, to calculate an inertial compensation component whose value will be equal to the product of a gain (called «second derivative gain»), representative of the inertia, by the second time derivative of the angular position θ3 of the steering wheel (that is to say the angular acceleration of the steering wheel).

Of course, the invention concerns as such a module 35 for managing a power steering, allowing the implementation of a method according to the invention.

Said management module 35, and more particularly each of all or part of its steering wheel torque reconstruction units 20, stiffness term calculation units 22, dissipation term calculation units 25, low-pass filtering units 26, 27, damping units 30, assist laws application units 28, weighting units 31, 32, steering wheel torque setpoint generation units 33, motor setpoint determination units 34, and/or still the main measuring circuit 21, may be formed by an electronic circuit, an electronic board, a calculator (computer), a programmable automaton, or any other equivalent device.

Each of said modules or units may have a physical control structure, related to the wiring of its electronic components, and/or, preferably, a virtual control structure, defined by computer programming.

Of course, the invention is in no way limited to the sole variants described in the foregoing, those skilled in the art being in particular able to isolate or to combine freely together any of the aforementioned features, or to substitute them with equivalents.

The invention claimed is:

1. A method of managing a power steering device for a vehicle, said power steering device comprising a steering wheel which allows a driver to maneuver said power steering device by exerting a force, called «steering wheel torque», on said steering wheel, as well as an assist motor intended to provide an assist force to assist the maneuver of said power steering device, said method being characterized in that it comprises a step (a) of reconstructing a steering wheel torque during which the steering wheel torque is evaluated, as it is actually exerted by the driver on the steering wheel, by reconstructing a representative information of said steering wheel torque, called «estimated steering wheel torque», from data called «external data» which are collected within the power steering device or within the vehicle, but excluding a steering wheel torque sensor specifically dedicated to measuring of said steering wheel torque, said external data comprising a value called «steering wheel angle» representative of the angular position of the steering wheel, a value called «motor angle» representative of the angular position of the shaft of the assist motor, as well as the time derivatives of said steering wheel angle and said motor angle and in that, at step (a) of reconstructing a steering wheel torque, on the one hand, a value called «steering wheel angle» representative of the angular position of the steering wheel, and on the other hand, a value called «motor angle» representative of the angular position of the shaft of the assist motor are collected as external data, the difference, called «relative displacement», between the steering wheel angle and the motor angle is calculated, then the relative displacement is multiplied by a predetermined stiffness coefficient, so as to obtain a first component of the estimated steering wheel angle, called «stiffness term».

2. The method according to claim 1, wherein at the steering wheel torque reconstruction step (a), the time derivative of the steering wheel angle is calculated to estimate the rotational angular speed of the steering wheel, called «steering wheel speed», the time derivative of the motor angle is calculated to estimate the rotational angular speed of the shaft of the assist motor, called «motor speed», the difference, called «relative speed», between the steering wheel speed and the motor speed is calculated, then the relative speed is multiplied by a predetermined viscosity coefficient, so as to obtain a second component of the estimated steering wheel angle, called «dissipation term», which is added to the stiffness term in order to obtain the estimated steering wheel torque.

3. The method according to claim 1, wherein the stiffness term, and/or respectively the dissipation term, are filtered by means of low-pass filters, whose cut-off frequency is adjusted according to the longitudinal speed of the vehicle (Vvehic).

4. The method according to claim 1, wherein the stiffness coefficient, and/or respectively the viscosity coefficient, are adjusted depending on to the longitudinal speed of the vehicle.

5. The method according to claim 4, wherein the stiffness coefficient follows an evolution law depending on the speed of the vehicle, called «stiffness law», according to which the stiffness coefficient first decreases, relative to its initial value associated to a zero speed, before reaching a minimum associated to a speed called «inversion speed», and then gradually increases again with the speed, so as to reach again and then exceed the initial value from and beyond a speed called «threshold speed», which marks the boundary between a first speed interval, called «low-speed range», and a second speed interval, called «high-speed range».

6. The method according to claim 4, wherein the viscosity coefficient follows an evolution law, called «viscosity law», decreasing depending on the speed of the vehicle.

7. The method according to claim 1, wherein after the torque reconstruction step (a), a step (b) of open-loop regulation of the assist motor, during which a motor torque setpoint which is applied to the assist motor is determined, said motor torque setpoint comprising, on the one hand, a base setpoint, which is determined from the estimated steering wheel torque, according to predefined assist laws, and on the other hand, a damping setpoint, which is calculated depending on the rotational angular speed of the shaft of the assist motor, called «motor speed», and which serves to adjust the base setpoint.

8. The method according to claim 7, wherein the damping setpoint is calculated proportionally to the motor speed, by applying a damping gain to said motor speed.

9. The method according to claim 7, wherein the damping setpoint is weighted by at least one first weighting coefficient which depends on the value of the estimated steering wheel torque.

10. The method according to claim 1, wherein the steering wheel angle is measured by means of a steering wheel angular position sensor associated to the steering wheel.

11. The method according to claim 1, wherein the motor angle is measured by means of a motor angular position sensor, for example of the resolver type, which is integrated into the assist motor.

12. The method according to claim 1, wherein it manages a power steering device within which the steering wheel is mounted on a steering column which meshes with a steering rack, and within which the assist motor is engaged on said steering column or on said steering rack, in that said power steering device includes a specific steering wheel torque sensor, mounted on the steering column and arranged to provide, in normal operation, a direct measurement of the steering wheel torque, and in that the steering wheel torque reconstruction step (a) automatically intervenes in case of failure of the specific steering wheel torque sensor to substitute an estimated steering wheel torque value with the direct measurement of the steering wheel torque.

13. The method according to claim 1, wherein it manages a power steering device within which the steering wheel is mounted on a steering column which meshes with a steering rack, and within which the assist motor is engaged on said steering column or on said steering rack, in that the steering column is devoid of a specific steering wheel torque sensor, and more particularly devoid of a torsion bar intended to measure the steering wheel torque, and in that the steering wheel torque reconstruction step (a) is used in normal operation to provide the steering wheel torque value necessary for the management of the power steering device.

* * * * *